United States Patent
Engebretsen et al.

(10) Patent No.: US 8,848,517 B2
(45) Date of Patent: *Sep. 30, 2014

(54) FENCING OFF SWITCH DOMAINS

(71) Applicant: International Business Machines Corporation, Armonk, NY (US)

(72) Inventors: David R. Engebretsen, Cannon Falls, MN (US); Stephen A. Knight, Rochester, MN (US); Jaimeson J. Saley, Rochester, MN (US); Bruce Wile, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/760,327

(22) Filed: Feb. 6, 2013

(65) Prior Publication Data

US 2014/0086044 A1 Mar. 27, 2014

Related U.S. Application Data

(63) Continuation of application No. 13/628,530, filed on Sep. 27, 2012.

(51) Int. Cl.
  *G01R 31/08* (2006.01)
  *H04L 12/28* (2006.01)
  *H04L 12/851* (2013.01)

(52) U.S. Cl.
  CPC ............ *H04L 47/24* (2013.01); *H04L 47/2441* (2013.01)
  USPC ............ 370/225; 370/235; 370/252; 370/256

(58) Field of Classification Search
  CPC ........................................... H04L 47/10–47/15
  USPC .................................................. 370/225–235
  See application file for complete search history.

(56) References Cited

U.S. PATENT DOCUMENTS

| 6,246,680 | B1 | 6/2001 | Muller et al. |
| 2006/0198356 | A1* | 9/2006 | Mayernick ................... 370/351 |
| 2009/0285128 | A1* | 11/2009 | Swan ............................ 370/256 |
| 2011/0085557 | A1 | 4/2011 | Gnanasekaran et al. |
| 2011/0090804 | A1* | 4/2011 | Wusirika ....................... 370/252 |
| 2012/0051232 | A1* | 3/2012 | Nomura ........................ 370/248 |
| 2012/0188865 | A1* | 7/2012 | Michaelis et al. ............ 370/200 |

OTHER PUBLICATIONS

U.S. Appl. No. 13/628,530, entitled Fencing Off Switch Domains, filed Sep. 27, 2012.

(Continued)

*Primary Examiner* — Brandon Renner
(74) *Attorney, Agent, or Firm* — Patterson & Sheridan, LLP

(57) ABSTRACT

Techniques are disclosed to reduce crossover between traffic from switch elements of different switch domains in a distributed switch. Addition of a first switch element to the distributed switch is detected. The distributed switch includes multiple switch elements at least subsequent to the addition, and each switch element has a switch element identifier and a fabric identifier. The respective fabric identifiers of the first switch element and of a second switch element are retrieved. The second switch element is communicably connected to the first switch element via a link, and the link is configured to allow only command traffic to be transmitted via the link. Upon a determination that the fabric identifier of the first switch element does not match the fabric identifier of the second switch element, then no command is issued specifying to reconfigure the link to allow at least one additional traffic type, different from command traffic.

8 Claims, 5 Drawing Sheets

(56) References Cited

OTHER PUBLICATIONS

U.S. Appl. No. 13/835,220 entitled "Directed Route Load/Store Packets for Distributed Switch Initialization," filed Mar. 15, 2013 by William T. Flynn et al.

U.S. Appl. No. 13/762,605 entitled "Management of Node Membership in a Distributed System," filed by David R. Engebretsen et al.

* cited by examiner

FENCING OFF SWITCH DOMAINS

CROSS-REFERENCE TO RELATED APPLICATIONS

This application is a continuation of co-pending U.S. patent application Ser. No. 13/628,530, filed Sep. 27, 2012. The aforementioned related patent application is herein incorporated by reference in its entirety.

BACKGROUND

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis.

SUMMARY

Embodiments disclosed herein provide a computer-implemented method, computer program product, and system to perform an operation to reduce crossover between traffic from switch elements of different switch domains in a distributed switch. The operation includes, upon detecting addition of a first switch element to the distributed switch, the distributed switch including multiple switch elements subsequent to the detected addition, each switch element of the switch elements having a switch element identifier and a fabric identifier. The operation also includes retrieving, respectively, the fabric identifiers of the first switch element and of a second switch element, where the second switch element is communicably connected to the first switch element via a link. The link is configured to allow only command traffic to be transmitted via the link. The operation also includes, upon determining that the retrieved fabric identifier of the first switch element does not match the retrieved fabric identifier of the second switch element, refraining from issuing any command specifying to reconfigure the link to allow at least one additional traffic type, different from command traffic.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1A:
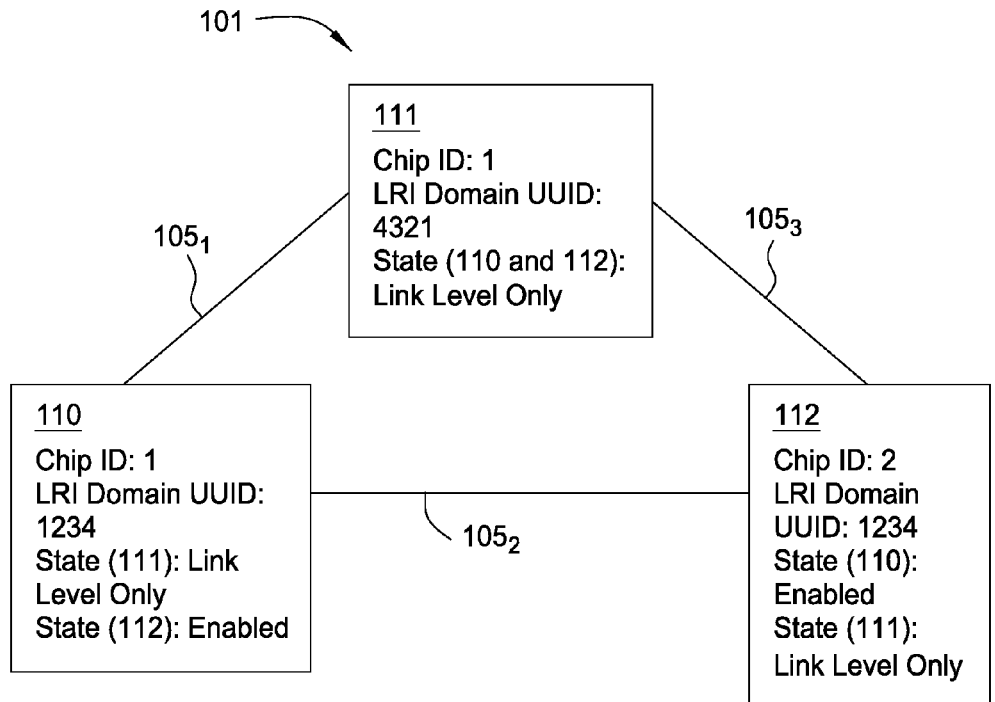
FIGS. 1A-1B are schematics illustrating techniques to fence off switch domains in a distributed switch, according to one embodiment disclosed herein.

Embodiments disclosed herein provide techniques for preventing or reducing crossover between traffic from switch elements of different switch domains in a distributed switch. System elements are often connected together through a switch fabric, which may be composed of multiple switch elements that are tied together to increase the switch capability and capacity. When switch elements are added, the total switch domain is expanded. The ability to dynamically grow the switch domain by adding switch elements is often a desired feature for the switch and the system. This is typically done by cabling in a new switch element to an existing fabric and then powering on the switch so it can be assimilated into the switch domain. However, due to concurrent maintenance requirements for servicing the switch domain, it is possible (and probable) that two previously established switch domains could be cabled together. The result of joining the two established switch domains will almost certainly cause collisions for switch resources and cause the entire switch to fail.

Accordingly, in one embodiment, a crossover reduction operation is performed in the distributed switch. The distributed switch has multiple switch elements, and each switch element has a switch element identifier and a switch fabric identifier, also referred to herein as a fabric identifier. The crossover reduction operation includes, upon determining a first switch element has been connected to the distributed switch, retrieving, respectively, the fabric identifiers of the first switch element and of an adjacent switch element communicably connected to the first switch element via a link. The link may be configured to allow only command traffic to be transmitted via the link. The crossover reduction operation further includes, upon determining the fabric identifier of the first switch element does not match the fabric identifier of the adjacent switch element, refraining from issuing any command specifying to reconfigure the link to allow at least one additional traffic type, different from command traffic. Doing so prevents or reduces crossover between traffic from switch elements of different switch domains at least in some cases.

In one embodiment, an arrangement of hardware and firmware provide a mechanism to detect when more than one switch fabric is connected and to dynamically disallow functional switch traffic to flow between the unlike switch domains, thus preventing error situations such as switch resource collisions. As used herein, functional switch traffic refers to traffic which allows for automatic routing of end user data to other switch elements based on their addresses. This automatic routing may be accomplished by a hardware transport. As used herein, "link level traffic" refers to traffic which does not include transport layer data or automatic routing knowledge, and is limited to link layer only command flows (i.e., no end user data).

In one embodiment, each switch element in a distributed switch domain has a set of links (referred to herein as "iLinks") used to form a communications fabric for the switch. The switch fabric may be referred to herein as a local rack interconnect (LRI) fabric. The multiple iLinks that form the LRI fabric are connected such that multiple paths between switch ingress and egress ports exist. In one embodiment, these ingress and egress ports are Ethernet and PCIe ports. However, embodiments of the disclosure contemplate a full range of port types. A result of the LRI fabric design may be that redundant iLink paths exist, and higher data throughput is achievable by using all the available redundant paths to share in the transport of switch data. However, before functional switch traffic is allowed to flow through the switch elements via the LRI fabric, the switch elements and their iLinks are first to be correctly initialized, according to one embodiment. The entire entity of the switch domain, including the switch elements, is managed by the fabric processing element. A single fabric processing element may manage multiple switch elements.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a schematic 101 illustrating techniques to fence off switch domains in a distributed switch, according to one embodiment disclosed herein. The schematic 101 shows three switch elements 110-112 connected together via an LRI fabric $105_{1-3}$. Although three switch elements 110-112 are shown, it should be understood that a greater number of switch elements may be connected to the LRI fabric 105, each with a set of respective point-to-point links. Each switch element 110-112 in the switch domain has a register set used by the fabric processing elements (not pictured) for controlling the behavior of all switch elements. The fabric processing elements within the switch domain are responsible for initializing and managing the switch elements through this register set. For example, the register set of each switch element 110-112 may include, settings corresponding to a unique chip identifier (ID) and an LRI domain universally unique identifier (UUID).

As switch elements are initialized and assimilated into the switch domain, the fabric processing element will allocate the unique chip ID for each switch element within the switch domain. The chip ID is used for addressing the different switch elements within the switch domain and for routing data between the switch elements within this domain. If the chip ID assigned to a switch element is not unique within the switch domain, then proper routing of data within the switch domain will not be possible, according to one embodiment. In addition to allocating chip IDs to switch elements, the fabric processing element will also generate the LRI domain UUID, which is unique to an instance of LRI fabric. Both the chip ID and the LRI domain UUID are stored in the switch element register set. Therefore, each switch element in the switch domain will share a common LRI domain UUID and will also have its own unique chip ID within the LRI switch domain.

As shown in FIG. 1A, the connections of each switch element 110-112 are operating at a respective state. The states of the switch elements 110-112 are managed partly by iLink hardware and partly by the fabric processing element, which manages the iLink state transitions. As shown, the state of the iLink between switch element 110 and switch element 112 (via LRI fabric $105_2$) is "enabled," indicating that all switch data, including functional switch traffic and link level only traffic, is allowed to be routed through the switch elements 110 and 112. The iLink connection of switch element 110 and switch element 111 (via LRI fabric $105_1$), however, is depicted as being in the "link level only" (LLO) state. Similarly, the iLink connection of switch element 111 and switch element 112 (via LRI fabric $105_3$) is depicted as being in the LLO state. The LLO state is a state issued to a newly connected switch element that was previously in a "down" state, which indicates the physical iLink was electrically disconnected. Therefore, at least in some embodiments, the switch element 111 may be viewed as being newly connected to the switch LRI fabric. In the down state, no data of any type can flow across the iLink. In the LLO state, an iLink connection does exist, and the physical connection is capable of transporting data. However, in some embodiments, the only data that is allowed to be transported in the LLO state is link level data only, such as link level traffic. Functional switch traffic will not flow through the switch element when the iLink is in the LLO state, and the iLink will appear disabled for purposes of transmitting functional switch traffic.

In one embodiment, the iLink hardware is designed such that when the switch element, for example switch element 111, is powered on or reset, the switch element will not automatically transition to the enabled state. The only way for an iLink to transition to the enabled state is by way of the fabric processing element issuing an enable command to the switch element iLink. Furthermore, at least in some embodiments, the iLink hardware will only allow the transition to the LLO state from the down state. Put another way, the iLink will never transition from the down state directly to the enabled state, at least in some embodiments. Hence, in all cases in such embodiments, the fabric processing element must instruct the iLink hardware on a switch element to transition to the enabled state.

In one embodiment, the fabric processing element also has functionality to "peek" across the iLinks of a switch element and read or modify the register space of the switch element attached to the other end of the iLink. This functionality is referred to as a directed route load/store (DRLS) and can be used if the iLink state is either LLO or enabled. As a result, the fabric processing element can "peek" across each iLink on a switch element and determine the operational state of the adjacent switch element. Accordingly, the fabric processing element can determine whether the adjacent switch element is in the same LRI domain by comparing its LRI domain UUID with that of the adjacent switch element. If the adjacent switch element does not have the same LRI domain UUID, then the fabric processing element will not issue the enable command to move the iLink to the enabled state, thus preventing crossover between domains. By operating in such a fashion, the LRI domains will not move functional switch traffic across different LRI domains, even if they are cabled together and powered on, effectively creating a fence between the LRI domains.

In FIG. 1A, the switch element 111 is in the LLO state, as it has been newly connected to the LRI fabric 105. Each switch element 110 and 112 in the domain 1234 has a unique chip ID, which is a requirement within a domain, at least in some embodiments. In such embodiments, a new switch element cannot be added to the switch domain which has a chip ID matching the chip ID of another switch element. Therefore, the switch element 111, having a chip ID of 1 would cause a conflict with the chip ID of switch element 110 (if they were part of the same domain). In such embodiments, therefore, the switch element 111 would not be enabled into the domain 1234. The switch elements 110 and 112 are each members of the domain 1234, as is indicated by their respective LRI domain UUIDs. However, the LRI domain UUID of the switch element 111 is 4321, which is not the same domain that the switch elements 110 and 112 are connected to. Therefore, the switch elements 110 and 112 will not issue an enable command to the switch element 111, and functional switch traffic from the domains having LRI domain UUIDs 1234 and 4321 will not be mixed, preventing a switch failure. The only link that will be enabled is the link $105_2$, between switch elements 110 and 112; links $105_1$ and $105_3$ will not be enabled. The switch element 111 may remain in the LLO state only until it is physically removed from the LRI fabric 105 or until its LRI domain UUID is changed to match the LRI domain UUIDs of switch elements 110 and 112, in which case the fabric processing element may issue the enable command to transition the switch element 111 to the enabled state.

Figure 1B:
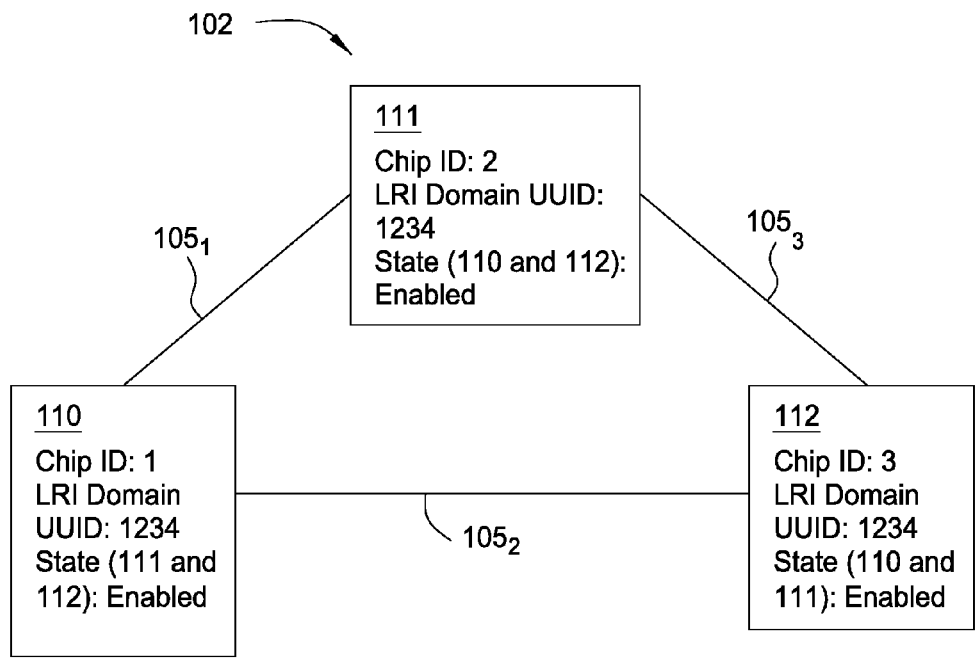

FIG. 1B is a schematic 102 illustrating techniques to fence off switch domains in a distributed switch, according to one embodiment disclosed herein. As shown, each of the switch elements 110-112 are connected via the LRI fabric 105. Each of the switch elements 110-112 have unique chip IDs and share the same LRI domain UUID, 1234. Therefore, each iLink of each switch element 110-112 has been transitioned to the enabled state. For example, when the switch element 111 is physically connected to the LRI fabric 105, the fabric processing element may issue a LLO state command to the switch element 111, causing the switch element 111 to transition to the LLO state. The fabric processing element may then read the chip ID and LRI domain UUID of the switch element 111 via DRLS to determine the chip ID and LRI domain UUID of the switch elements 110 and 112, respectively. Upon retrieving the chip IDs and LRI domain UUIDs of the switch elements 110-112 and determining that the LRI domain UUIDs match, the fabric processing element may issue the enable command to the switch element 111 hardware, which then transitions the switch element 111 to the enabled state. The iLink connections $105_{1-3}$ will be enabled for each switch element 110-112. The switch element 111 may be assigned a chip ID which is unique to the LRI domain 1234. Once in the enabled state, the switch element 111 may transfer all functional switch traffic, i.e., enter normal runtime use.

Figure 2:
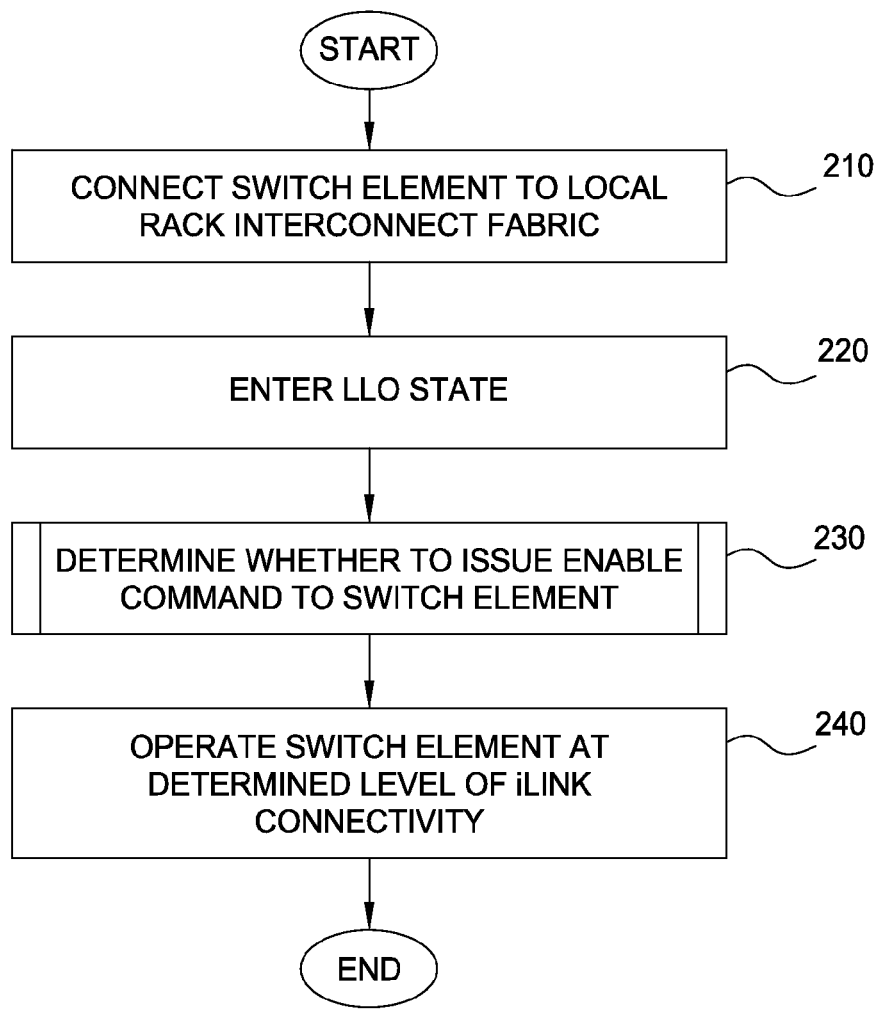
FIG. 2 is a flow chart illustrating a method to fence off switch domains in a distributed switch, according to one embodiment disclosed herein.

FIG. 2 is a flow chart illustrating a method 200 to fence off switch domains in a distributed switch, according to one embodiment disclosed herein. Generally, the method 200 prevents crossover of data between two different switch domains, effectively creating a fence between switch modules which are members of different switch domains. Some steps of the method 200 may be performed by a designated component of the distributed switch, for example, a fabric processing element residing in a master controller component of the switch module. An example of the master controller component is an Input/Output Management Controller (IOMC). At step 210, a switch element is connected to the local rack interconnect (LRI) fabric. At step 220 the switch element enters the LLO state. A switch element may enter the LLO state by a switch element reset or the disconnection of an iLink. In one embodiment, the switch element may automatically enter the LLO state after a reset and will automatically transition to the LLO state on each iLink disconnect. At step 230, described in greater detail in reference to FIG. 3, the fabric processing element determines whether to issue an enable command to the switch element, such that functional switch data may flow through the switch element. At step 240, the connected switch element is operated at the determined level of iLink connectivity.

Figure 3:
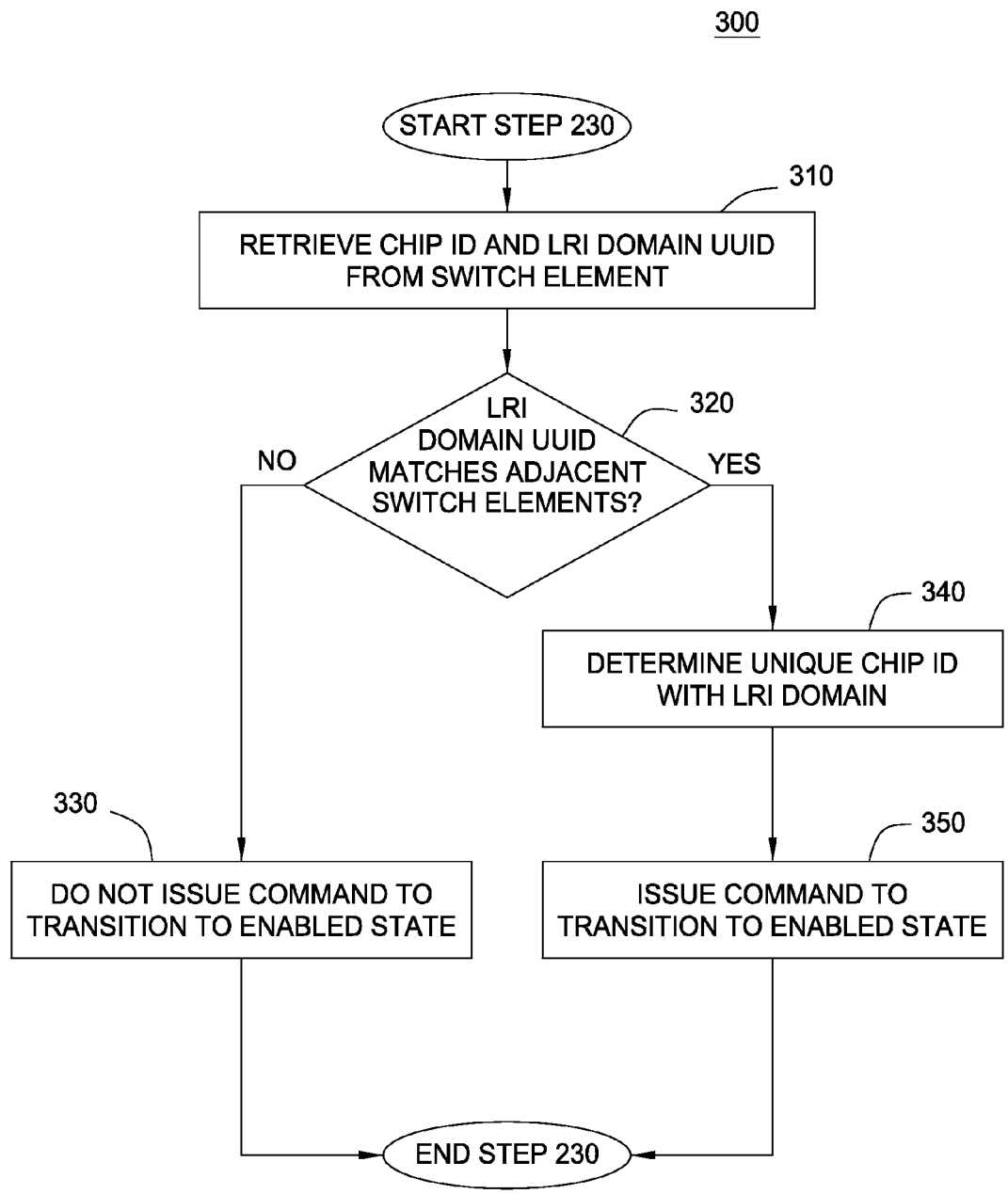
FIG. 3 is a flow chart illustrating a method to determine whether to issue an enable command to a switch element, according to one embodiment disclosed herein.

FIG. 3 is a flow chart illustrating a method 300 corresponding to step 230 to determine whether to issue an enable command to a switch element, according to one embodiment disclosed herein. In some embodiments, the fabric processing element performs the steps of the method 300. At step 310, the fabric processing element retrieves the chip ID and the LRI domain UUID from the registers of the switch element connected at step 210. At step 320, the fabric processing element determines whether LRI domain UUID of the switch matches the LRI domain UUID of all adjacent switch elements.

In one embodiment, the fabric processing element utilizes directed route load/store (DRLS) to retrieve the LRI domain UUIDs of the adjacent switch elements. The fabric processing element, upon retrieving the LRI domain UUIDs of the adjacent switch elements, determines whether the LRI domain UUIDs of the adjacent switch elements match the LRI domain UUID of the switch element connected at step 210. If the LRI domain UUID matches the LRI domain UUIDs of the adjacent switch elements, the method proceeds to step 340. If the LRI domain UUIDs do not match, the method proceeds to step 330. At step 330, the fabric processing element does not issue the enable command to transition to the enabled state. At step 340, the fabric processing element determines a unique chip ID to allocate to the switch element. The unique chip ID may be determined based on identifying which IDs are currently used within the LRI domain. At step 350, the fabric processing element issues the enable command to transition the enabled state, and the switch element is transitioned to the enabled state. Once the switch element transitions to the enabled state, the switch element is considered a part of the switch domain and can transfer functional switch traffic within the switch domain.

Figure 4:
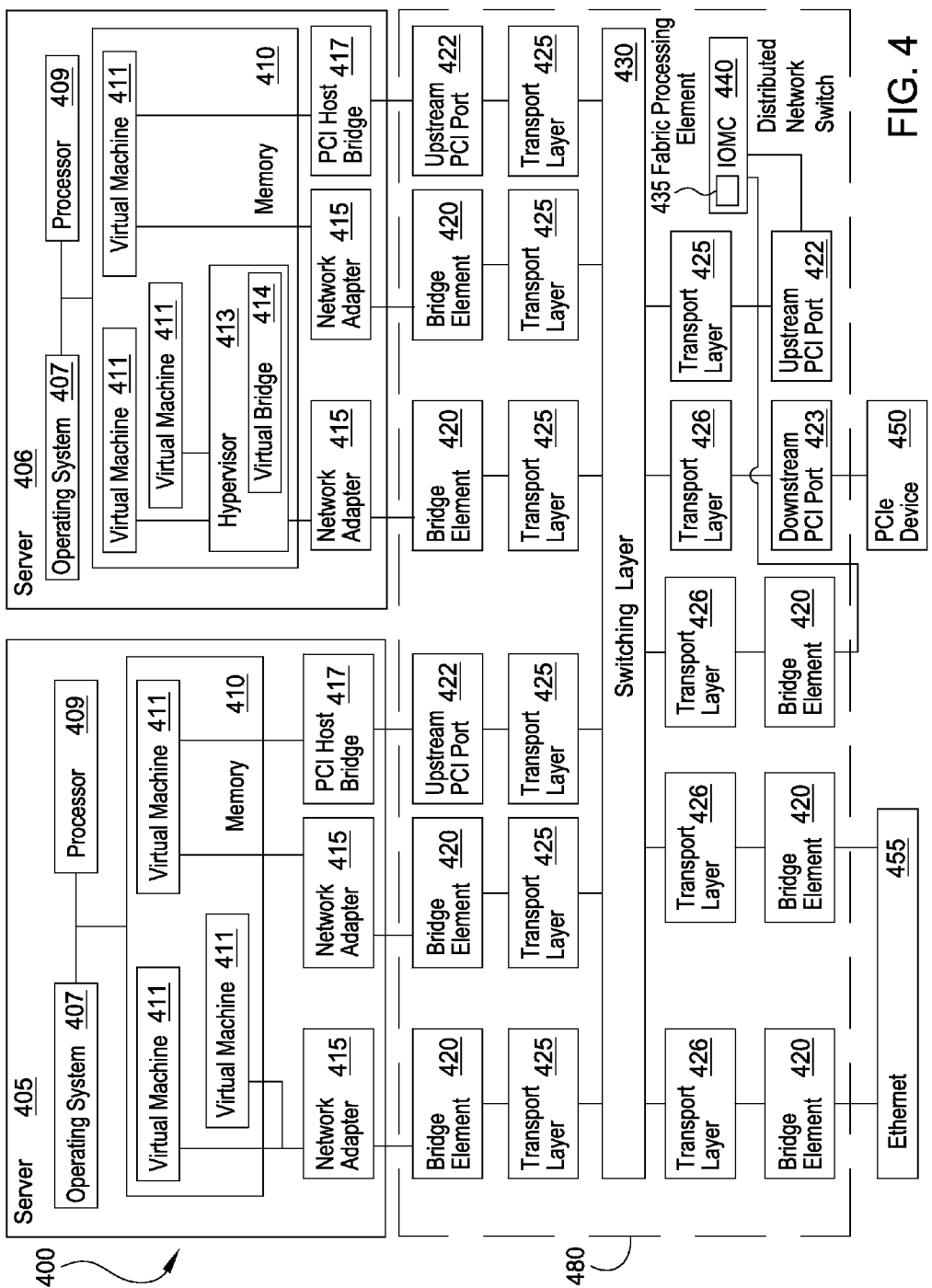
FIG. 4 illustrates a system architecture that includes a distributed switch, according to one embodiment described herein.

FIG. 4 illustrates a system architecture 400 that includes a distributed switch, according to one embodiment disclosed herein. The first server 405 may include at least one processor 409 coupled to a memory 410. The processor 409 may represent one or more processors (e.g., microprocessors) or multi-core processors. The memory 410 may represent random access memory (RAM) devices comprising the main storage of the server 405, as well as supplemental levels of memory, e.g., cache memories, non-volatile or backup memories (e.g., programmable or flash memories), read-only memories, and the like. In addition, the memory 410 may be considered to include memory storage physically located in the server 405 or on another computing device coupled to the server 405.

The server 405 may operate under the control of an operating system 407 and may execute various computer software applications, components, programs, objects, modules, and data structures, such as virtual machines 411.

The server 405 may include network adapters 415 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 400 may include a multi-root I/O virtualization (MR-IOV) adapter. The network adapters 415 may further be used to implement of Fiber Channel over Ethernet (FCoE) protocol, RDMA over Ethernet, Internet small computer system interface (iSCSI), and the like. In general, a network adapter 415 transfers data using an Ethernet or PCI based communication method and may be coupled to one or more of the virtual machines 411. Additionally, the adapters may facilitate shared access between the virtual machines 411. While the adapters 415 are shown as being included within the server 405, in other embodiments, the adapters may be physically distinct devices that are separate from the server 405.

In one embodiment, each network adapter 415 may include a converged adapter virtual bridge (not shown) that facilitates data transfer between the adapters 415 by coordinating access to the virtual machines 411. Each converged adapter virtual bridge may recognize data flowing within its domain (i.e., addressable space). A recognized domain address may be routed directly without transmitting the data outside of the domain of the particular converged adapter virtual bridge.

Each network adapter 415 may include one or more Ethernet ports that couple to one of the bridge elements 420. Additionally, to facilitate PCIe communication, the server may have a PCI Host Bridge 417. The PCI Host Bridge 417 would then connect to an upstream PCI port 422 on a switch element in the distributed switch 480. The data is then routed via the switching layer 430 to the correct downstream PCI port 423 which may be located on the same or different switch module as the upstream PCI port 422. The data may then be forwarded to the PCI device 450.

The bridge elements 420 may be configured to forward data frames throughout the distributed switch 480. For example, a network adapter 415 and bridge element 420 may be connected using two 40 Gbit Ethernet connections or one 100 Gbit Ethernet connection. The bridge elements 420 forward the data frames received by the network adapter 415 to the switching layer 430. The bridge elements 420 may include a lookup table that stores address data used to forward the received data frames. For example, the bridge elements 420 may compare address data associated with a received data frame to the address data stored within the lookup table.

Thus, the network adapters 415 do not need to know the network topology of the distributed switch 480.

The distributed switch 480, in general, includes a plurality of bridge elements 420 that may be located on a plurality of a separate, though interconnected, hardware components. To the perspective of the network adapters 415, the switch 480 acts like one single switch even though the switch 480 may be composed of multiple switches that are physically located on different components. Distributing the switch 480 provides redundancy in case of failure.

Each of the bridge elements 420 may be connected to one or more transport layer modules 425 that translate received data frames to the protocol used by the switching layer 430. For example, the transport layer modules 425 may translate data received using either an Ethernet or PCI communication method to a generic data type (i.e., a cell) that is transmitted via the switching layer 430 (i.e., a cell fabric). Thus, the switch modules comprising the switch 480 are compatible with at least two different communication protocols—e.g., the Ethernet and PCIe communication standards. That is, at least one switch module has the necessary logic to transfer different types of data on the same switching layer 430.

Although not shown in FIG. 4, in one embodiment, the switching layer 430 may comprise a local rack interconnect with dedicated connections which connect bridge elements 420 located within the same chassis and rack, as well as links for connecting to bridge elements 420 in other chassis and racks.

After routing the cells, the switching layer 430 may communicate with transport layer modules 426 that translate the cells back to data frames that correspond to their respective communication protocols. A portion of the bridge elements 420 may facilitate communication with an Ethernet network 455 which provides access to a LAN or WAN (e.g., the Internet). Moreover, PCI data may be routed to a downstream PCI port 423 that connects to a PCIe device 450. The PCIe device 450 may be a passive backplane interconnect, as an expansion card interface for add-in boards, or common storage that can be accessed by any of the servers connected to the switch 480.

Although "upstream" and "downstream" are used to describe the PCI ports, this is only used to illustrate one possible data flow. For example, the downstream PCI port 423 may in one embodiment transmit data from the connected to the PCIe device 450 to the upstream PCI port 422. Thus, the PCI ports 422, 423 may both transmit as well as receive data.

A second server 406 may include a processor 409 connected to an operating system 407 and memory 410 which includes one or more virtual machines 411 similar to those found in the first server 405. The memory 410 of server 406 also includes a hypervisor 413 with a virtual bridge 414. The hypervisor 413 manages data shared between different virtual machines 411. Specifically, the virtual bridge 414 allows direct communication between connected virtual machines 411 rather than requiring the virtual machines 411 to use the bridge elements 420 or switching layer 430 to transmit data to other virtual machines 411 communicatively coupled to the hypervisor 413.

An Input/Output Management Controller (IOMC) 440 (i.e., a special-purpose processor) is coupled to at least one bridge element 420 or upstream PCI port 422 which provides the IOMC 440 with access to the switching layer 430. One function of the IOMC 440 may be to receive commands from an administrator to configure the different hardware elements of the distributed switch 480. In one embodiment, these commands may be received from a separate switching network from the switching layer 430.

Although one IOMC 440 is shown, the system 400 may include a plurality of IOMCs 440. In one embodiment, these IOMCs 440 may be arranged in a hierarchy such that one IOMC 440 is chosen as a master while the others are delegated as members (or slaves).

A fabric processing element 435 may reside in the IOMC 440, as well as each IOMC of the system 400. The fabric processing element may be firmware or other logic within the IOMC which generally controls the admission of new switch elements to the distributed switch 480 to prevent crossover between different switch domains. The fabric processing element may generally perform the functionality recited above, namely issuing commands to trigger a state transition in the switch element from "down" to "link level only" (LLO), and from "LLO" to "enabled." The fabric processing element will only issue the "enabled" command upon determining that the switch element has a LRI domain UUID matching the LRI domain UUID of its adjacent switch elements.

Figure 5:
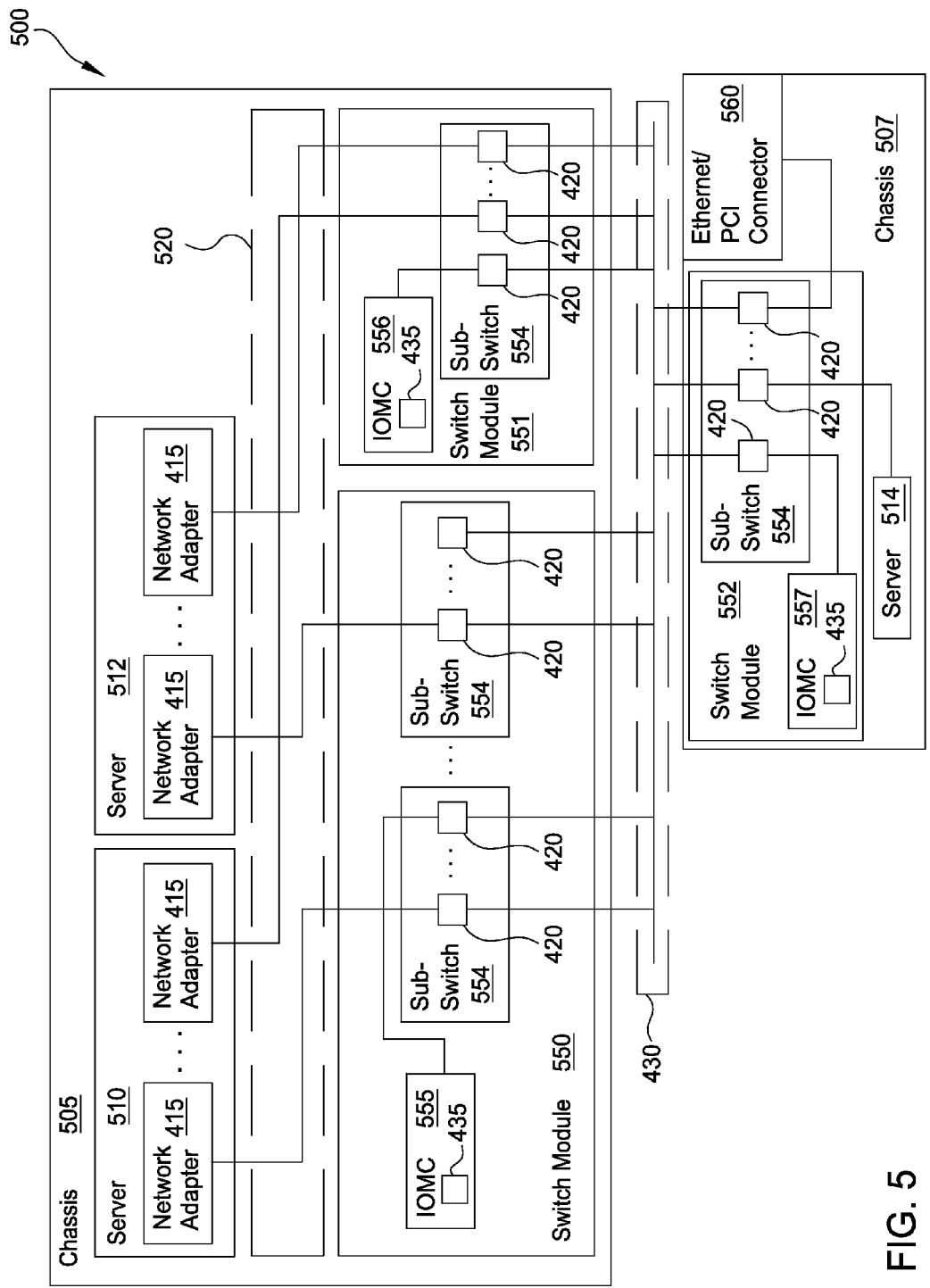
FIG. 5 illustrates the hardware representation of a system that implements a distributed switch, according to one embodiment described herein.

FIG. 5 illustrates the hardware representation of a system 500 that implements a distributed switch, according to one embodiment disclosed herein. Server 510 and 512 may be physically located in the same chassis 505; however, the chassis 505 may include any number of servers. The chassis 505 also includes a plurality of switch modules 550, 551 that include one or more sub-switches 554 (i.e., a microchip). In one embodiment, the switch modules 550, 551, 552 are hardware components (e.g., PCB boards, FPGA boards, etc.) that provide physical support and connectivity between the network adapters 415 and the bridge elements 420. In general, the switch modules 550, 551, 552 include hardware that connects different chassis 505, 507 and servers 510, 512, 514 in the system 500 and may be a single, replaceable part in the computing system.

The switch modules 550, 551, 552 (e.g., a chassis interconnect element) include one or more sub-switches 554 and an IOMC 555, 556, 557. The sub-switches 554 may include a logical or physical grouping of bridge elements 420—e.g., each sub-switch 554 may have five bridge elements 420. Each bridge element 420 may be physically connected to the servers 510, 512. For example, a bridge element 420 may route data sent using either Ethernet or PCI communication protocols to other bridge elements 420 attached to the switching layer 430 using the routing layer. However, in one embodiment, the bridge element 420 may not be needed to provide connectivity from the network adapter 415 to the switching layer 430 for PCI or PCIe communications.

Each switch module 550, 551, 552 includes an IOMC 555, 556, 557 for managing and configuring the different hardware resources in the system 500. In one embodiment, the respective IOMC for each switch module 550, 551, 552 may be responsible for configuring the hardware resources on the particular switch module. However, because the switch modules are interconnected using the switching layer 430, an IOMC on one switch module may manage hardware resources on a different switch module. As discussed above, the IOMCs 555, 556, 557 are attached to at least one sub-switch 554 (or bridge element 420) in each switch module 550, 551, 552 which enables each IOMC to route commands on the switching layer 430. For clarity, these connections for IOMCs 556 and 557 have been omitted. Moreover, switch modules 551, 552 may include multiple sub-switches 554.

Each IOMC 555, 556, 557 has a fabric processing element 435 to control the addition of switch elements 420 to the switch module 550, 551, and 552. The fabric processing element 435 creates a fence between different switch domains by restricting switch elements 420 having different LRI domain UUIDs than adjacent switch elements from becoming enabled. The fabric processing element 435 will only issue a command to enable the switch elements 420 upon determining that the LRI domain UUIDs of the adjacent switch modules 420 match.

The dotted line in chassis 505 defines the midplane 520 between the servers 510, 512 and the switch modules 550, 551. That is, the midplane 520 includes the data paths (e.g., conductive wires or traces) that transmit data between the network adapters 415 and the sub-switches 554.

Each bridge element 420 connects to the switching layer 430 via the routing layer. In addition, a bridge element 420 may also connect to a network adapter 415 or an uplink. As used herein, an uplink port of a bridge element 420 provides a service that expands the connectivity or capabilities of the system 500. As shown in chassis 507, one bridge element 420 includes a connection to an Ethernet or PCI connector 560. For Ethernet communication, the connector 560 may provide the system 500 with access to a LAN or WAN (e.g., the Internet). Alternatively, the port connector 560 may connect the system to a PCIe expansion slot—e.g., PCIe device 450. The device 450 may be additional storage or memory which each server 510, 512, 514 may access via the switching layer 430. Advantageously, the system 500 provides access to a switching layer 430 that has network devices that are compatible with at least two different communication methods.

As shown, a server 510, 512, 514 may have a plurality of network adapters 415. This provides redundancy if one of these adapters 415 fails. Additionally, each adapter 415 may be attached via the midplane 520 to a different switch module 550, 551, 552. As illustrated, one adapter of server 510 is communicatively coupled to a bridge element 420 located in switch module 550 while the other adapter is connected to a bridge element 420 in switch module 551. If one of the switch modules 550, 551 fails, the server 510 is still able to access the switching layer 430 via the other switching module. The failed switch module may then be replaced (e.g., hot-swapped) which causes the IOMCs 555, 556, 557 and bridge elements 420 to update the routing tables and lookup tables to include the hardware elements on the new switching module.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method to reduce crossover between traffic from switch elements of different switch domains in a distributed switch, the method comprising:
   upon detecting addition of a first switch element to the distributed switch, the distributed switch including a plurality of switch elements subsequent to the detected addition, each switch element of the plurality of switch elements having a switch element identifier and a fabric identifier:
     retrieving, respectively, the fabric identifiers of the first switch element and of a second switch element of the plurality of switch elements, wherein the second switch element is communicably connected to the first switch element via a link, wherein the link is configured to allow only command traffic to be transmitted via the link; and
     upon determining, by operation of one or more computer processors, that the fabric identifier of the first switch element matches the fabric identifier of the second switch element and that the switch element identifier of the first switch element does not match the switch element identifier of the second switch element, issuing a command specifying to reconfigure the link to allow at least one additional traffic type, different from command traffic.

2. The method of claim 1,
   wherein the command is not issued upon determining that the fabric identifier of the first switch element does not match the fabric identifier of the second switch element, wherein the link is reconfigured responsive to the issued command.

3. The method of claim 2, wherein the command specifying to reconfigure the link to allow the at least one additional traffic type is not issued
   upon determining that the switch element identifier of the first switch element matches the switch element identifier of the second switch element and that the fabric identifier of the first switch element matches the fabric identifier of the second switch element.

4. The method of claim 1, wherein the at least one additional traffic type comprises data traffic.

5. The method of claim 1, wherein the command traffic includes one or more commands issued by a master controller component of the distributed switch.

6. The method of claim 1, wherein each fabric identifier comprises a local rack interconnect (LRI) domain universally unique identifier (UUID).

7. The method of claim 1, wherein the link is configured to, upon being electrically connected to the distributed switch, transition to a command state characterized by allowing only command traffic to be transmitted via the link.

8. The method of claim 1, wherein the at least one additional traffic type is allowed to be transmitted via the link only in response to the issued command.

* * * * *